(12) United States Patent
Parsons et al.

(10) Patent No.: US 9,185,989 B1
(45) Date of Patent: Nov. 17, 2015

(54) PILLOW AND SHADE FOR AN AUTOMOBILE

(71) Applicants: Joshua Parsons, Holiday, FL (US);
Thomas Parsons, Holiday, FL (US)

(72) Inventors: Joshua Parsons, Holiday, FL (US);
Thomas Parsons, Holiday, FL (US)

( * ) Notice: Subject to any disclaimer, the term of this patent is extended or adjusted under 35 U.S.C. 154(b) by 0 days.

(21) Appl. No.: 14/507,976

(22) Filed: Oct. 7, 2014

(51) Int. Cl.
B60R 21/055 (2006.01)
A47C 7/38 (2006.01)
A47C 16/00 (2006.01)
B60N 2/48 (2006.01)
B60J 3/02 (2006.01)
A47G 9/10 (2006.01)

(52) U.S. Cl.
CPC . A47C 16/00 (2013.01); A47G 9/10 (2013.01); B60J 3/0247 (2013.01); B60N 2/4879 (2013.01)

(58) Field of Classification Search
CPC ..... A47C 16/00; B60N 2/4879; B60J 3/0247; A47G 9/10
USPC .............. 297/392, 393, 394, 395, 397, 184.1
See application file for complete search history.

(56) References Cited

U.S. PATENT DOCUMENTS

| | | | | |
|---|---|---|---|---|
| 3,220,770 A * | 11/1965 | Schaeffer | ...................... | 297/395 |
| 3,578,383 A * | 5/1971 | Earl | ................ | 297/391 |
| 3,608,964 A * | 9/1971 | Earl | ................ | 297/397 |
| 4,015,542 A * | 4/1977 | Gutridge et al. | .......... | 297/395 X |
| 4,335,773 A * | 6/1982 | Masi | .............. | 160/23.1 |
| 4,607,886 A * | 8/1986 | Mazhar | ..................... | 297/395 X |
| 4,679,263 A * | 7/1987 | Honer | ........................ | 297/393 X |
| 4,770,466 A * | 9/1988 | Pesterfield | ................ | 297/395 X |
| 4,828,287 A * | 5/1989 | Siler | ......................... | 297/395 X |
| 4,880,275 A * | 11/1989 | Lanteri | ..................... | 297/395 X |
| 4,919,483 A * | 4/1990 | Horkey | ......................... | 297/395 |
| 4,944,548 A | 7/1990 | Payne | | |
| 4,951,998 A | 8/1990 | McClain | | |
| 4,985,950 A * | 1/1991 | Gladish | ..................... | 297/395 X |
| 5,024,479 A * | 6/1991 | Bryngelson | .................. | 296/97.7 |
| 5,054,855 A * | 10/1991 | Williams et al. | .............. | 297/395 |
| 5,123,704 A * | 6/1992 | Peterson | ........................ | 297/395 |
| 5,140,713 A * | 8/1992 | Pesterfield | ..................... | 4/575.1 |
| 5,317,772 A * | 6/1994 | Perl et al. | .................. | 297/395 X |
| 5,330,251 A * | 7/1994 | McGuire | ................ | 297/184.1 X |
| 5,382,078 A * | 1/1995 | Lanteri | ........................ | 297/395 |
| 5,395,159 A * | 3/1995 | Pinto | ............................ | 297/395 |
| 5,465,776 A | 11/1995 | Mirza | | |
| 5,588,476 A | 12/1996 | Trethewey | | |
| D379,169 S * | 5/1997 | Johnson et al. | .............. | D12/183 |
| 5,800,018 A | 9/1998 | Colombo | | |
| 5,868,471 A * | 2/1999 | Graham et al. | ............... | 297/397 |
| 5,961,087 A * | 10/1999 | Lee | ................ | 248/362 |
| 6,227,600 B1 * | 5/2001 | Chen | ........................ | 296/97.2 |
| D492,874 S | 7/2004 | Fux | | |
| 6,942,297 B2 * | 9/2005 | Johnson | ........................ | 297/397 |
| 7,185,694 B2 * | 3/2007 | Dunn et al. | .............. | 160/370.22 |
| 7,393,057 B2 * | 7/2008 | Fraser | .......................... | 297/392 |

(Continued)

FOREIGN PATENT DOCUMENTS

CN 103445590 12/2013

Primary Examiner — Rodney B White
(74) Attorney, Agent, or Firm — Kyle A. Fletcher, Esq.

(57) ABSTRACT

The pillow and shade for an automobile includes a pillow that is secured to a securing member. The securing member is configured to secure itself to a window of a vehicle in order to secure the pillow against the window of the vehicle. The pillow is further defined with a top edge on which an armature extends to support a visor member. The visor member forms a shade that is configured to cast over a head of an end user. The head of the end user is positioned against said pillow.

15 Claims, 4 Drawing Sheets

(56) References Cited

U.S. PATENT DOCUMENTS

| | | |
|---|---|---|
| 7,398,816 B2 | 7/2008 | Sala |
| 7,441,292 B2 * | 10/2008 | Williams et al. .......... 297/397 X |
| 7,444,697 B2 | 11/2008 | Williams |
| 7,657,954 B1 * | 2/2010 | Bunkers ............................ 5/644 |
| 8,239,987 B2 * | 8/2012 | Sharp ................................ 5/639 |
| 8,990,980 B1 * | 3/2015 | Hindley ............................ 5/490 |
| 2005/0199357 A1 | 9/2005 | Dunn |
| 2011/0043025 A1 * | 2/2011 | Park .............................. 297/393 |

* cited by examiner

PILLOW AND SHADE FOR AN AUTOMOBILE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of pillows and shade-providing devices, more specifically, an accessory for use within a vehicle, which provides a pillow and a shade visor.

SUMMARY OF THE INVENTION

An embodiment of the disclosure meets the needs presented above by generally comprising a pillow that is secured to a securing member. The securing member is configured to secure itself to a window of a vehicle in order to secure said pillow against said window of said vehicle. The pillow is further defined with a top edge on which an armature extends to support a visor member. Said visor member is configured to be adjusted in order to form a shade that is configured to cast over a head of an end user. Said head of said end user being positioned against said pillow.

These together with additional objects, features and advantages of the pillow and shade for an automobile will be readily apparent to those of ordinary skill in the art upon reading the following detailed description of presently preferred, but nonetheless illustrative, embodiments of the pillow and shade for an automobile when taken in conjunction with the accompanying drawings.

In this respect, before explaining the current embodiments of the pillow and shade for an automobile in detail, it is to be understood that the pillow and shade for an automobile is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pillow and shade for an automobile.

It is therefore important that the claims be regarded as including such equivalent construction insofar as they do not depart from the spirit and scope of the pillow and shade for an automobile. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
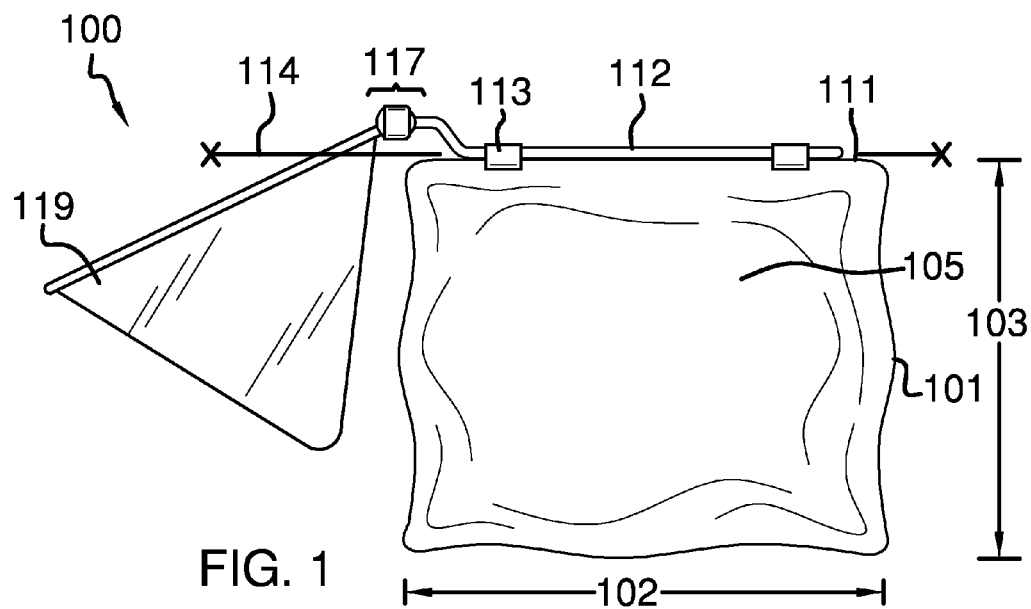
FIG. 1 is a front view of an embodiment of the disclosure.
Figure 2:
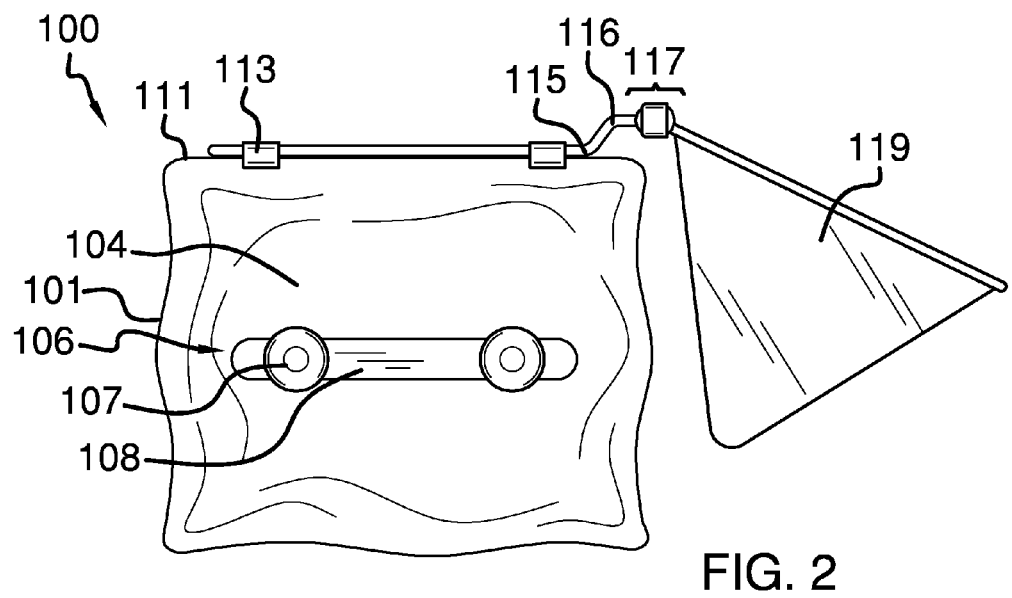
FIG. 2 is a rear view of an embodiment of the disclosure.
Figure 3:
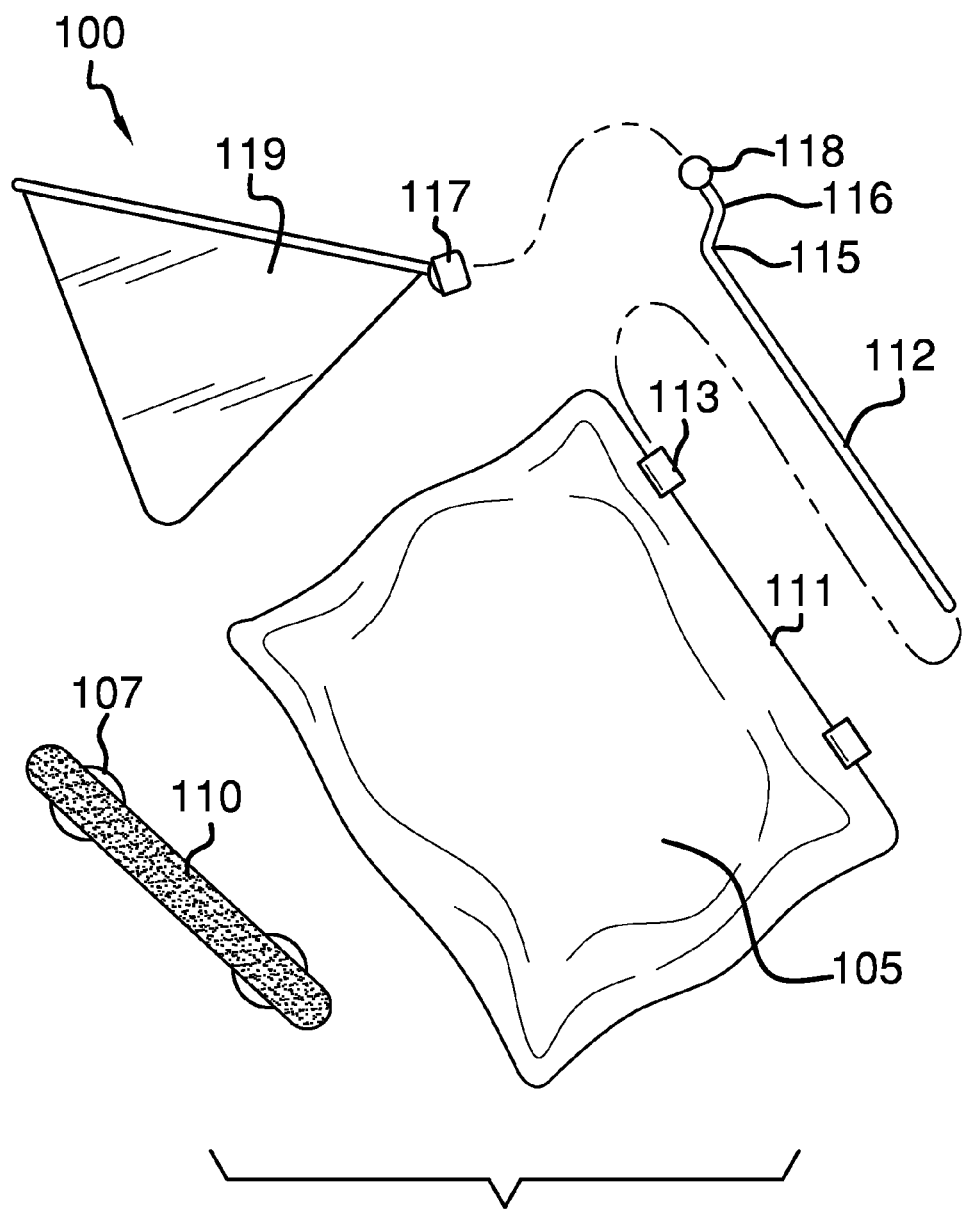
FIG. 3 is an exploded view of an embodiment of the disclosure.
Figure 4:
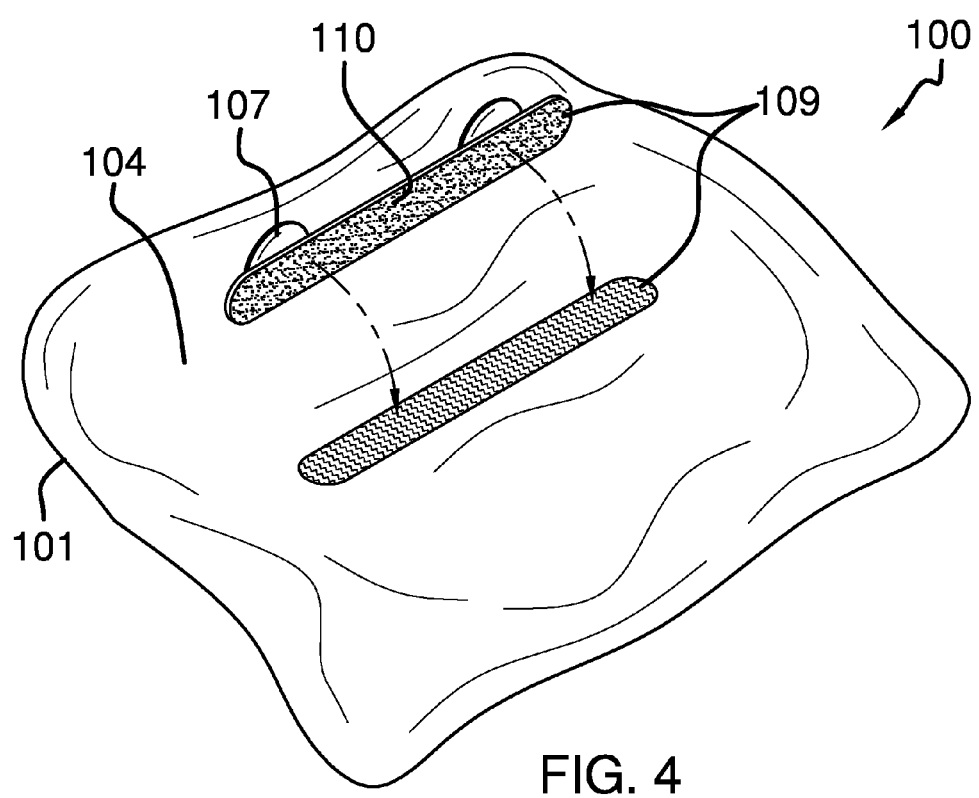
FIG. 4 is a detail view of an embodiment of the disclosure.
Figure 5:
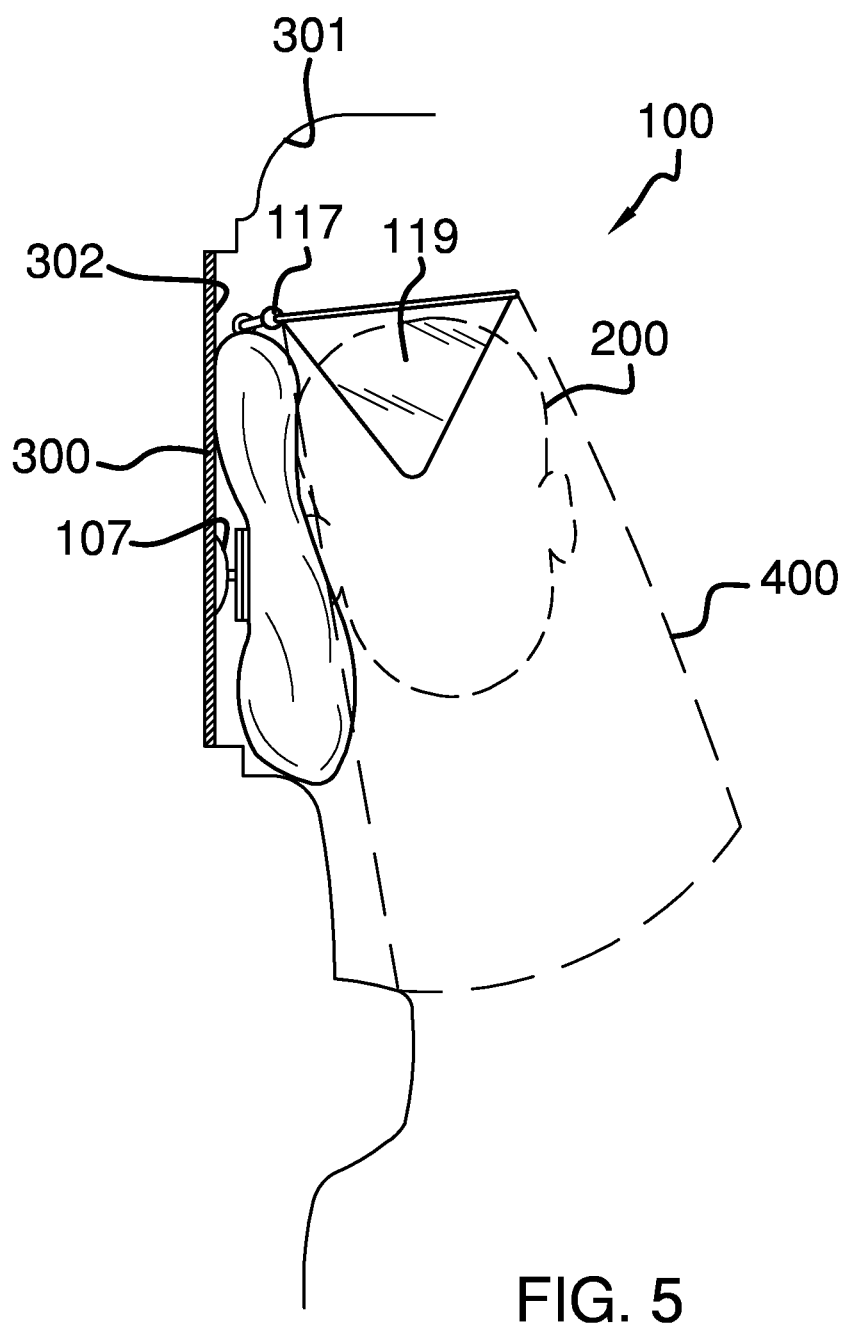
FIG. 5 is a detail view of an embodiment of the disclosure in use.

As best illustrated in FIGS. 1 through 5, the pillow and shade for an automobile 100 (hereinafter invention) generally comprises a pillow 101 that is further defined with a pillow length 102, and a pillow height 103. The pillow 101 is further defined with a rear pillow surface 104 as well as a front pillow surface 105. The front pillow surface 105 is configured to receive a head 200 of an end user thereon. The rear pillow surface 104 includes a securing member 106 thereon.

The securing member 106 is composed of at least one suction cup 107 that is affixed to a rear securing member surface 108. The securing member 106 includes a nylon hook and loop strip 109 provided on a forward securing member surface 110 as well as the rear pillow surface 104. The securing member 106 is able to disconnect the at least one suction cup 107 from the rear pillow surface 104. The at least one suction cup 107 is adapted to be secured to a window 300 of a vehicle 301. Moreover, the at least one suction cup 107 is adapted to be secured to an inner window surface 302 of said window 300.

The pillow 101 is further defined with a top pillow edge 111. An armature 112 is affixed to the top pillow edge 111 of the pillow 101 via at least one armature bracket 113. Moreover, the at least one armature bracket 113 enables the armature 112 to rotate or slide about a longitudinal axis 114 of the armature 112. The armature 112 is further defined with a first bend 115 and a second bend 116. Adjacent the second bend 116 is a second ball joint bracket member 117, which includes a sphere 118 that is pivotably engaged with respect to the ball joint bracket member 117. The ball joint bracket member 117 is affixed to a visor member 119.

The visor member 119 is triangularly-shaped, and may be made of a tinted material so as to provide a shaded region 400 covering over the head 200 of the end user. The visor member 119 is able to pivot with respect to the armature 112 via the second ball joint bracket member 117.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pillow and shade for an automobile comprising:
   a visor member rotatably engaged with respect to said pillow;
   said visor member being configured to provide a shade region over a head of an end user;
   said pillow being configured to receive said head thereon;
   wherein said pillow includes a securing member that is configured to be secured against a window in a vehicle;
   wherein the pillow is further defined with a top pillow edge; wherein an armature is affixed to the top pillow edge of the pillow via at least one armature bracket.

2. The pillow and shade for an automobile according to claim 1 wherein the pillow is further defined with a pillow length, and a pillow height; wherein the pillow is further defined with a rear pillow surface as well as a front pillow surface.

3. The pillow and shade for an automobile according to claim 2 wherein the front pillow surface is configured to receive the head of the end user thereon.

4. The pillow and shade for an automobile according to claim 3 wherein the rear pillow surface includes the securing member thereon.

5. The pillow and shade for an automobile according to claim 4 wherein the securing member is composed of at least one suction cup that is affixed to a rear securing member surface.

6. The pillow and shade for an automobile according to claim 5 wherein the securing member includes a nylon hook and loop strip provided on a forward securing member surface as well as the rear pillow surface.

7. The pillow and shade for an automobile according to claim 6 wherein the securing member is able to disconnect the at least one suction cup from the rear pillow surface.

8. The pillow and shade for an automobile according to claim 7 wherein the at least one suction cup is adapted to be secured to the window of the vehicle; wherein the at least one suction cup is adapted to be secured to an inner window surface of said window.

9. The pillow and shade for an automobile according to claim 8 wherein the at least one armature bracket enables the armature to rotate or slide about a longitudinal axis of the armature.

10. The pillow and shade for an automobile according to claim 9 wherein the armature is further defined with a first bend and a second bend; wherein adjacent the second bend is a second ball joint bracket member, which includes a sphere that is pivotably engaged with respect to the ball joint bracket member.

11. The pillow and shade for an automobile according to claim 10 wherein the ball joint bracket member is affixed to the visor member.

12. The pillow and shade for an automobile according to claim 11 wherein the visor member is triangularly-shaped, and provides said shaded region covering over the head of the end user; wherein the visor member pivots with respect to the armature via the second ball joint bracket member.

13. A pillow and shade for an automobile comprising:
    a visor member rotatably engaged with respect to said pillow;
    said visor member being configured to provide a shade region over a head of an end user;
    said pillow being configured to receive said head thereon;
    wherein said pillow includes a securing member that is configured to be secured against a window in a vehicle;
    wherein the pillow is further defined with a pillow length, and a pillow height; wherein the pillow is further defined with a rear pillow surface as well as a front pillow surface;
    wherein the front pillow surface is configured to receive the head of the end user thereon; wherein the rear pillow surface includes the securing member thereon;
    wherein the securing member is composed of at least one suction cup that is affixed to a rear securing member surface; wherein the securing member includes a nylon hook and loop strip provided on a forward securing member surface as well as the rear pillow surface;
    wherein the securing member is able to disconnect the at least one suction cup from the rear pillow surface; wherein the at least one suction cup is adapted to be secured to the window of the vehicle; wherein the at least one suction cup is adapted to be secured to an inner window surface of said window;
    wherein the pillow is further defined with a top pillow edge; wherein an armature is affixed to the top pillow edge of the pillow via at least one armature bracket; wherein the at least one armature bracket enables the armature to rotate or slide about a longitudinal axis of the armature.

14. The pillow and shade for an automobile according to claim 13 wherein the armature is further defined with a first bend and a second bend; wherein adjacent the second bend is a second ball joint bracket member, which includes a sphere that is pivotably engaged with respect to the ball joint bracket member.

15. The pillow and shade for an automobile according to claim 14 wherein the ball joint bracket member is affixed to the visor member; wherein the visor member is triangularly-shaped, and provides said shaded region covering over the head of the end user; wherein the visor member pivots with respect to the armature via the second ball joint bracket member.

* * * * *